US 9,042,485 B2

(12) United States Patent
Guo (10) Patent No.: US 9,042,485 B2
(45) Date of Patent: May 26, 2015

(54) METHOD AND DEVICE FOR RETRANSMITTING DATA UNDER ANTENNA GAIN IMBALANCE

(75) Inventor: Yang Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/368,493

(22) PCT Filed: Mar. 16, 2012

(86) PCT No.: PCT/CN2012/072462
§ 371 (c)(1),
(2), (4) Date: Jun. 24, 2014

(87) PCT Pub. No.: WO2013/097359
PCT Pub. Date: Jul. 4, 2013

(65) Prior Publication Data
US 2014/0376664 A1    Dec. 25, 2014

(30) Foreign Application Priority Data

Dec. 26, 2011    (CN) .......................... 2011 1 0441776

(51) Int. Cl.
*H04L 27/00*    (2006.01)
*H04L 1/18*    (2006.01)
(Continued)

(52) U.S. Cl.
CPC ............... *H04L 1/1896* (2013.01); *H04L 1/06* (2013.01); *H04L 1/1893* (2013.01); *H04L 1/0041* (2013.01); *H04L 27/2626* (2013.01)

(58) Field of Classification Search
CPC ....... H04L 1/0618; H04L 1/06; H04L 1/1893; H04L 1/0041; H04L 27/2626; H04B 7/0669; H04B 7/0417
See application file for complete search history.

(56) References Cited

U.S. PATENT DOCUMENTS 8,068,462 B2    11/2011    Chang et al.
2008/0248753 A1    10/2008    Chang et al.
(Continued)

FOREIGN PATENT DOCUMENTS

CN    1838583 A    9/2006
CN    101924619 A    12/2010
(Continued)

OTHER PUBLICATIONS

International Search Report in international application No. PCT/CN2012/072462, mailed on Oct. 4, 2012. (2 pages—see entire document).

(Continued)

*Primary Examiner* — Ted Wang
(74) *Attorney, Agent, or Firm* — Oppedahl Patent Law Firm LLC (57) ABSTRACT

The disclosure provides a method and device for retransmitting data under antenna gain imbalance, and the method includes: determining that gains of multiple antennas at a transmission terminal are imbalanced; using a better spatial sub-channel in the multiple antennas to retransmit data when streams transmitted by the multiple antennas adopt a same Modulation and Coding Scheme; and using a better spatial sub-channel in the multiple antennas to retransmit data and/or using a single-stream approach to retransmit data when the streams transmitted by the multiple antennas adopt different Modulation and Coding Schemes. The disclosure selects a corresponding retransmission approach according to the condition of a spatial sub-channel on which streams have an error, thus improving and ensuring success rate for retransmitting a stream.

16 Claims, 4 Drawing Sheets

(51) Int. Cl.
  *H04L 1/06* (2006.01)
  *H04L 1/00* (2006.01)
  *H04L 27/26* (2006.01)

(56) References Cited

U.S. PATENT DOCUMENTS

| | | |
|---|---|---|
| 2009/0028263 A1 | 1/2009 | Yu et al. |
| 2010/0279621 A1 | 11/2010 | Brown |
| 2011/0026420 A1 | 2/2011 | Zhang |
| 2011/0207415 A1* | 8/2011 | Luo et al. ............... 455/68 |
| 2013/0010745 A1* | 1/2013 | Ko et al. ............... 370/329 |

FOREIGN PATENT DOCUMENTS

| | | |
|---|---|---|
| CN | 102148655 A | 8/2011 |
| CN | 102215095 A | 10/2011 |

OTHER PUBLICATIONS

English Translation of the Written Opinion of the International Search Authority in international application No. PCT/CN2012/072462, mailed on Oct. 4, 2012. (5 pages—see entire document).

* cited by examiner

METHOD AND DEVICE FOR RETRANSMITTING DATA UNDER ANTENNA GAIN IMBALANCE

TECHNICAL FIELD

The disclosure relates to the field of data retransmission, and in particular to a method and device for retransmitting data under antenna gain imbalance.

BACKGROUND

Multi-Input Multi-output (MIMO) technique may implement space division multiplexing by adopting a multi-stream transmission technique to improve data transmission rate when the quality of a channel is relatively good, and acquire a diversity gain by adopting a single-stream transmission technique to improve date transmission reliability when the quality of a channel is relatively poor.

An effective combination of Automatic Repeat Request (ARQ) and Forward Error Correction (FEC) provides not only a higher reliability than the reliability of a single FEC system but also a higher system throughput than the throughput of a single ARQ system. Therefore, with a strong need for a high-data-rate service or a high-reliability service, Hybrid Automatic Repeat Request (HARQ) already becomes a key technique in wireless communications and is studied in depth.

The MIMO technique and HARQ technique are already applied in the field of wireless communications, for example, they are applied both in a Worldwide Interoperability for Microwave Access (WiMAX) system and a Long Term Evolution (LTE) system. But in a multi-antenna system, Antenna Gain Imbalance (AGI) may reduce radiation power and affect the performance of a receiver, thus it is desired to study AGI's effect on the performance of system and to change a transmission strategy and a retransmission strategy, so as to optimize the performance in the presence of the AGI.

SUMMARY

In view of the above, the disclosure provides a method and device for retransmitting data under Antenna Gain Imbalance (AGI), which can select a better transmission approach in the presence of the AGI so as to ensure the success rate of stream retransmissions.

To this end, the technical solutions of the disclosure are implemented as follows.

A method for retransmitting data under AGI includes:

when it is determined that gains of multiple antennas at a transmission terminal are imbalanced, a better spatial sub-channel in the multiple antennas is used to retransmit data when streams transmitted by the multiple antennas adopt a same Modulation and Coding Scheme, and a better spatial sub-channel in the multiple antennas is used to retransmit data and/or a single-stream approach is used to retransmit data when the streams transmitted by the multiple antennas adopt different Modulation and Coding Schemes.

In an embodiment, the step of determining that gains of multiple antennas at a transmission terminal are imbalanced may include:

a channel estimation is performed according to pilot information transmitted by the transmission terminal, calculating Signal Interference Noise Ratios (SINRs) corresponding to streams transmitted by the multiple antennas, and when difference between calculated SINRs exceeds a preset threshold, it is determined that the AGI exists.

In an embodiment, the step of using a better spatial sub-channel in the multiple antennas to retransmit data when streams transmitted by the multiple antennas adopt a same Modulation and Coding Scheme may include:

when only one stream has an error, a spatial sub-channel having a better channel performance in the multiple antennas is used to retransmit the stream having an error; and when all streams have an error, each spatial sub-channel retransmits correspondingly its own stream having an error.

In an embodiment, the step of using a better spatial sub-channel in the multiple antennas to retransmit data and/or using a single-stream approach to retransmit data when the streams transmitted by the multiple antennas adopt different Modulation and Coding Schemes may include:

when only one stream has an error, a spatial sub-channel having a better channel performance in the multiple antennas is used to retransmit data, or when all streams have an error, the single-stream approach in the multiple antennas is used first to retransmit streams having an error on the spatial sub-channel having a better channel performance, then the spatial sub-channel having a better channel performance in the multiple antennas is used to retransmit streams having an error on other spatial sub-channels.

In an embodiment, there may be two spatial sub-channels for transmitting a stream.

A device for retransmitting data under Antenna Gain Imbalance (AGI) includes: a first determination unit, a second determination unit, a first retransmission unit and a second retransmission unit, wherein the first determination unit is configured to: when it is determined that gains of multiple antennas at a transmission terminal are imbalanced, trigger the second determination unit;

the second determination unit is configured to: when it is determined that streams transmitted by the multiple antennas adopt a same Modulation and Coding Scheme, trigger the first retransmission unit; and when streams transmitted by the multiple antennas adopt different Modulation and Coding Schemes, trigger the second retransmission unit.

the first retransmission unit is configured to use a better spatial sub-channel in the multiple antennas to retransmit data; and the second retransmission unit is configured to: when the streams transmitted by the multiple antennas adopt different Modulation and Coding Schemes, use a better spatial sub-channel in the multiple antennas to retransmit data and/or use a single-stream approach to retransmit data.

In an embodiment, the first determination unit may further include: a channel estimation module, a calculation module and a determination module, wherein the channel estimation module is configured to perform a channel estimation according to pilot information transmitted by the transmission terminal;

the calculation module is configured to calculate Signal Interference Noise Ratios (SINRs) corresponding to streams transmitted by the multiple antennas according to a channel estimation result;

the determination module is configured to: when difference between calculated SINRs exceeds a preset threshold, determine that the AGI exists.

In an embodiment, the first retransmission unit may be further configured to: when only one stream has an error, use a spatial sub-channel having a better channel performance in the multiple antennas to retransmit the stream having an error; and when all streams have an error, retransmit correspondingly, by each spatial sub-channel, its own stream having an error.

In an embodiment, the second retransmission unit may be further configured to: when only one stream has an error, use a spatial sub-channel having a better channel performance in the multiple antennas to retransmit data, or use the single-stream approach in the multiple antennas to retransmit data; and when all streams have an error, use the single-stream approach first in the multiple antennas to retransmit streams having an error on the spatial sub-channel having a better channel performance, then use the spatial sub-channel having a better channel performance in the multiple antennas to retransmit streams having an error on other spatial sub-channels.

In an embodiment, there may be two spatial sub-channels for transmitting a stream.

In the disclosure, when it is determined that gains of multiple antennas at a transmission terminal are imbalanced, a better spatial sub-channel in the multiple antennas is used to retransmit data when streams transmitted by the multiple antennas adopt a same Modulation and Coding Scheme, and a better spatial sub-channel in the multiple antennas is used to retransmit data and/or a single-stream approach is used to retransmit data when the streams transmitted by the multiple antennas adopt different Modulation and Coding Schemes. The disclosure chooses a corresponding retransmission approach according to the condition of a spatial sub-channel on which streams have an error, thus improving and ensuring success rate for retransmitting a stream.

DETAILED DESCRIPTION

The basic idea of the disclosure is, when a network side determines that gains of multiple antennas at a transmission terminal are imbalanced, a better spatial sub-channel in the multiple antennas is used to retransmit data when streams transmitted by the multiple antennas adopt a same Modulation and Coding Scheme, and a better spatial sub-channel in the multiple antennas is used to retransmit data and/or a single-stream approach is used to retransmit data when the streams transmitted by the multiple antennas adopt different Modulation and Coding Schemes.

In order to make objectives, technical solutions and advantages of the disclosure more clear, the disclosure will be further elaborated below in combination with the accompanying drawings and embodiments.

By studying layer mapping and pre-coding of a Physical Uplink Shared Channel (PUSCH) in an existing Long Term Evolution-Advanced (LTE-A) system, it can be seen that each stream is eventually mapped to a certain antenna, that is to say, in a uplink LTE-A system, an antenna corresponds one-to-one with a stream. Therefore, the effect of AGI on a stream can be regarded as an effect on the energy reduction of a certain stream.

In embodiments of the disclosure, it is pre-defined that a stream having a high SINR (with a good performance) is a stream 1, and a stream with a relatively poor performance is a stream 2.

A base station performs a channel estimation according to pilot information transmitted by a UE, and calculates SINRs of channels corresponding to the two streams, in general, a Channel Quality Indication (CQI) can be determined by a SINR. Firstly, the SINRs of the two streams are calculated respectively, and it is determined according to the SINRs of the two streams whether an AGI condition exists. In general, it is considered that AGI exists when the SINRs of the two streams is equal to or greater than 3 dB, and the system performance will be remarkably affected. The technical solutions of the disclosure are aimed at how to implement retransmission of data having an error when AGI occurs.

It should be noted that though the disclosure is described by taking two spatial sub-channels in a LTE-A system as an example, the technical solutions of the disclosure may also be suitable for a case of multiple spatial sub-channels.

Figure 1:
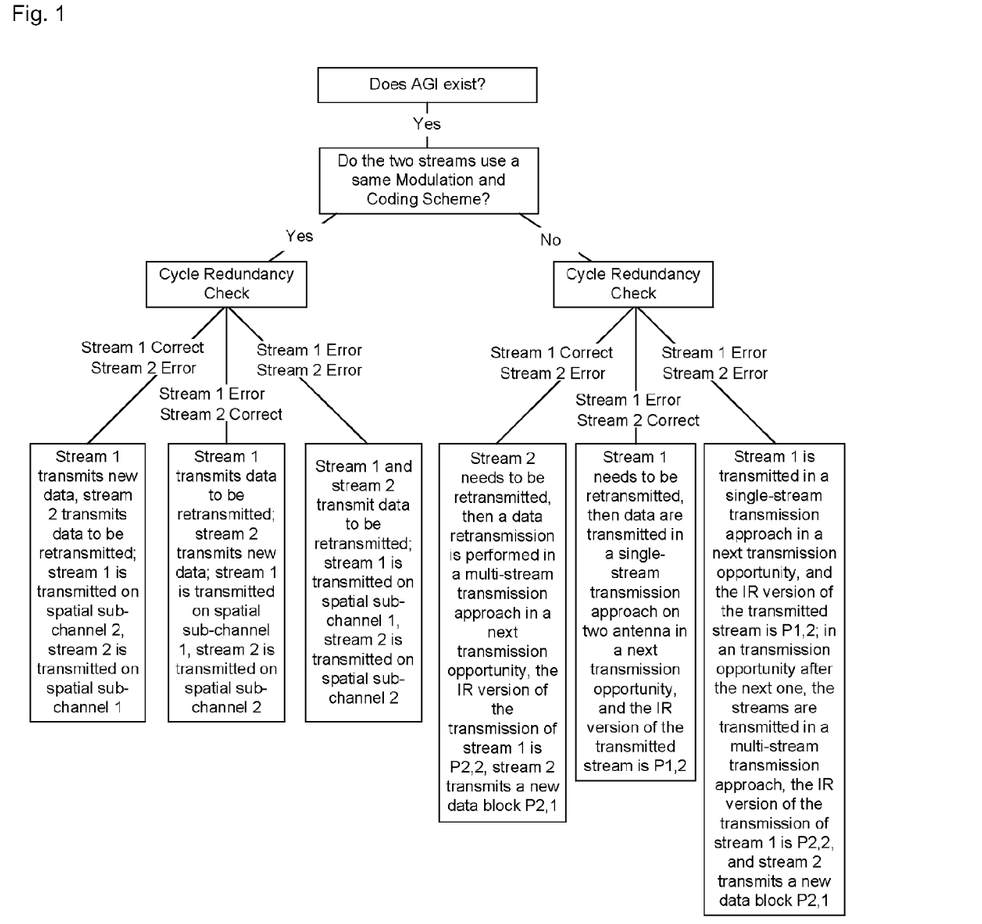
FIG. 1 is a flow chart of a method for retransmitting data under Antenna Gain Imbalance (AGI) according to an embodiment of the disclosure.

FIG. 1 is a flow chart of a method for retransmitting data under AGI according to an embodiment of the disclosure. As shown in FIG. 1, when a network side determines that AGI occurs to a UE, it is desired to consider whether two steams in the two spatial sub-channels adopt a same Modulation and Coding Scheme, and when the two streams adopt the same Modulation and Coding Scheme, since the performance of the SINR of the stream 1 is better, the probability for the stream 1 to have an error is relatively low; when one of the two streams has an error, retransmitting data to be retransmitted on a better spatial sub-channel to the greatest extent will help to ensure a correct reception of retransmitted data; only when both of the two streams have an error, each spatial sub-channel of respective streams retransmits respectively its own stream. When the two streams adopt different Modulation and Coding Schemes, though the performance of the SINR of the stream 1 is better, the stream 1 may adopt a higher Modulation and Coding Scheme than that of the stream 2, thus the probability for the stream 1 to have an error is not necessarily lower than that of the stream 2, it is desired in this case to set a retransmission approach according to a particular case, and a corresponding description is made as follows.

In the case that the two streams adopt different Modulation and Coding Schemes, due to the difference of Modulation and Coding Scheme, versions of Incremental Redundancy (IR) will also be different. For the streams, two versions of the stream 1 are respectively P1,1 and P1,2, and two versions of the stream 2 are respectively P2,1 and P2,2; the first digits 1 or 2 behind the character P represent the stream 1 or 2, the second digit 1 represents new data, and the second digit 2 represents retransmitted data. Specifically, when only one stream has an error, a spatial sub-channel having a better channel performance is used by the multiple antennas to retransmit data, or a single-stream approach is used to retransmit data; or when all streams have an error, the single-stream approach is used first by the multiple antennas to retransmit streams having an error on the spatial sub-channel having a better channel performance, then the spatial sub-channel having a better channel performance is used to retransmit streams having an error on other spatial sub-channels.

The technical solutions of the disclosure will be further elaborated below in combination with specific embodiments.

Figure 2:
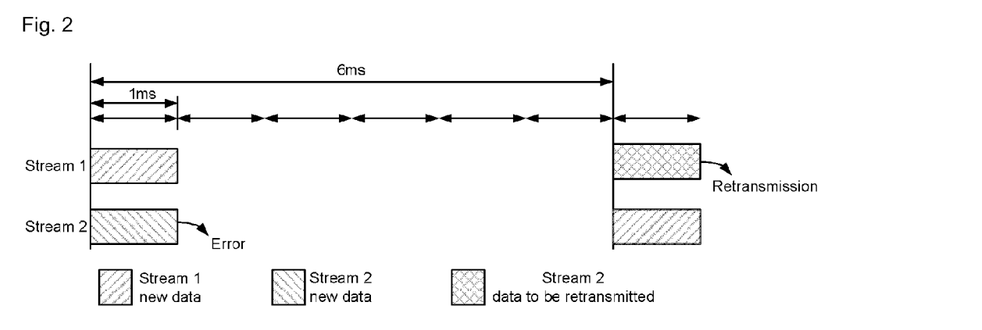
FIG. 2 is a schematic diagram of a retransmission in the case that two streams use a same Modulation and Coding Scheme, a stream 1 is correct, and a stream 2 has an error when the AGI exists according to an embodiment of the disclosure.

FIG. 2 is a schematic diagram of a retransmission in the case that two streams use a same Modulation and Coding Scheme, a stream 1 is correct, and a stream 2 has an error when the AGI exists according to an embodiment of the disclosure. As shown in FIG. 2, in this case, for the stream 1, it does not need to be retransmitted and new data can be transmitted; for the stream 2, data need to be retransmitted, in order to ensure the success rate of retransmitting the stream 2, a spatial sub-channel 1 having a better channel condition is selected to retransmit the stream 2, in this way, the stream 1 is transmitted on a spatial sub-channel 2, and the stream 2 is retransmitted on the spatial sub-channel 1. For the stream 1, new data are being transmitted at this point.

Figure 3:
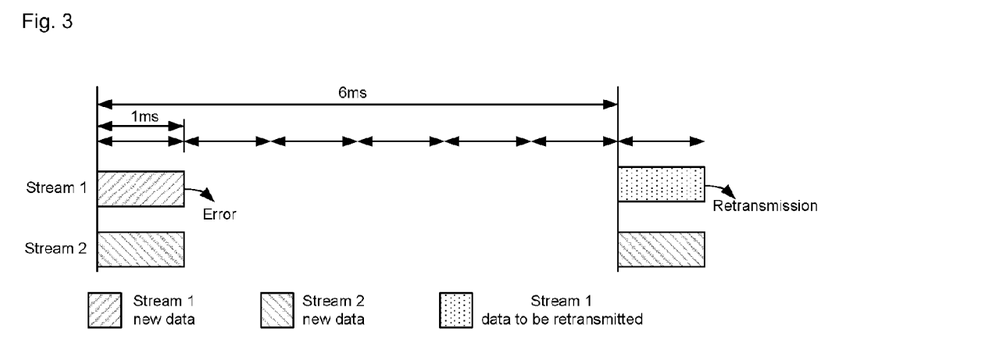
FIG. 3 is a schematic diagram of a retransmission in the case that two streams use a same Modulation and Coding Scheme, the stream 1 has an error, and the stream 2 is correct when the AGI exists according to an embodiment of the disclosure.

FIG. 3 is a schematic diagram of a retransmission in the case that two streams use a same Modulation and Coding Scheme, the stream 1 has an error, and the stream 2 is correct when the AGI exists according to an embodiment of the disclosure. As shown in FIG. 3, in this case, for the stream 1, data need to be retransmitted; for the stream 2, it does not need to be retransmitted and new data can be transmitted; in order to ensure the success rate of stream retransmission, the stream 1 is retransmitted on the spatial sub-channel 1 having a better channel condition, and the stream 2 is transmitted on the spatial sub-channel 2. For the stream 2, new data are being transmitted at this point.

Figure 4:
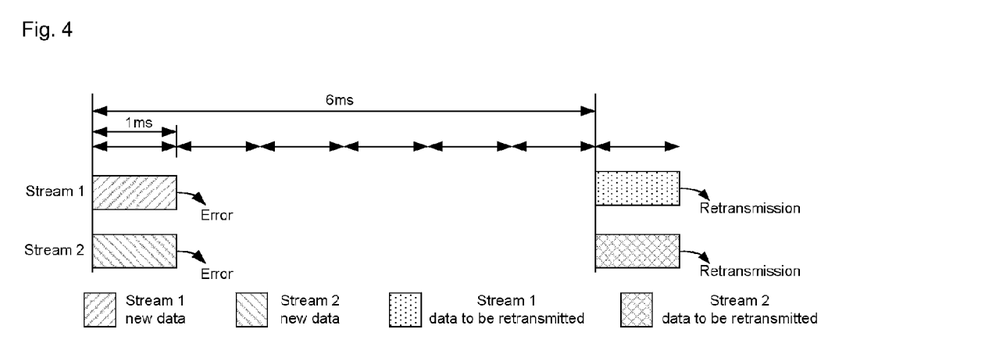
FIG. 4 is a schematic diagram of a retransmission in the case that two streams use a same Modulation and Coding Scheme, the stream 1 has an error, and the stream 2 also has an error when the AGI exists according to an embodiment of the disclosure.

FIG. 4 is a schematic diagram of a retransmission in the case that two streams use a same Modulation and Coding Scheme, the stream 1 has an error, and the stream 2 also has an error when the AGI exists according to an embodiment of the disclosure. As shown in FIG. 4, in this case, both of the stream 1 and the stream 2 have an error, thus each spatial sub-channel retransmits respectively the stream corresponding to itself, i.e., the stream 1 is retransmitted on the spatial sub-channel 1 and the stream 2 is retransmitted on the spatial sub-channel 2.

Figure 5:
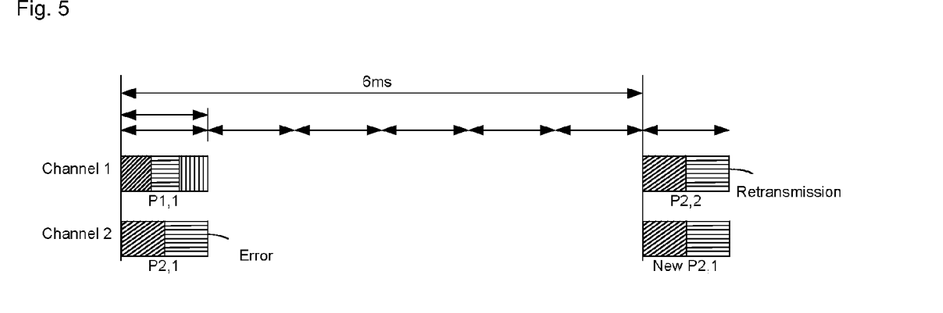
FIG. 5 is a schematic diagram of a retransmission in the case that two streams use different Modulation and Coding Schemes, the stream 1 is correct, and the stream 2 has an error when the AGI exists according to an embodiment of the disclosure.

FIG. 5 is a schematic diagram of a retransmission in the case that two streams use different Modulation and Coding Schemes, the stream 1 is correct, and the stream 2 has an error when the AGI exists according to an embodiment of the disclosure. In this case, the stream 2 needs to be retransmitted, then a data retransmission is performed in a multi-stream transmission approach in a next transmission opportunity, the channel 1 where the stream 1 is located transmits a stream with a IR version of P2,2, and the stream 2 still transmits a new data block P2,1. Here, it should be noted that since the Modulation and Coding Schemes of the stream 1 and the stream 2 are different, the retransmission approaches are also different from those in the case that streams adopt a same Modulation and Coding Scheme, for the stream 2 to be retransmitted, the more reliable spatial sub-channel 1 is still selected to perform retransmission, but at this point, for the spatial sub-channel 2, the stream 2 is also transmitted.

Figure 6:
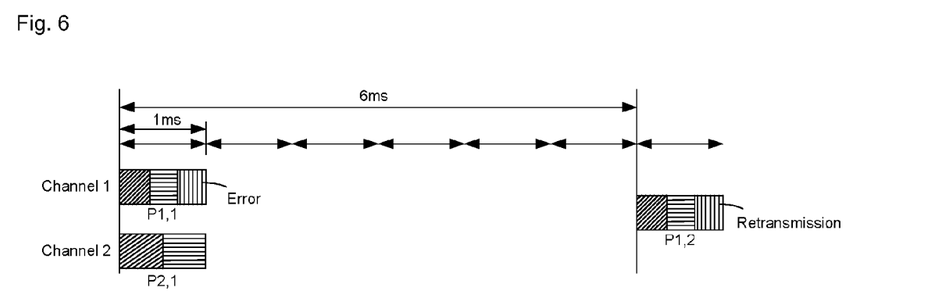
FIG. 6 is a schematic diagram of a retransmission in the case that two streams use different Modulation and Coding Schemes, the stream 1 has an error, and the stream 2 is correct when the AGI exists according to an embodiment of the disclosure.

FIG. 6 is a schematic diagram of a retransmission in the case that two streams use different Modulation and Coding Schemes, the stream 1 has an error, and the stream 2 is correct when the AGI exists according to an embodiment of the disclosure. As shown in FIG. 6, in this case, the stream 1 needs to be retransmitted, then data are transmitted in a single-stream transmission approach in a next transmission opportunity, and the IR version of the transmitted stream is P1,2. When an data transmission error occurs to the spatial sub-channel having a better channel condition, in order to the reliability of retransmitting the stream 1, when a next data transmission opportunity comes, only the stream 1 to be retransmitted is transmitted, and data of the stream 2 are not transmitted any longer, so as to avoid the effect of inter-channel interference on the retransmission result.

Figure 7:
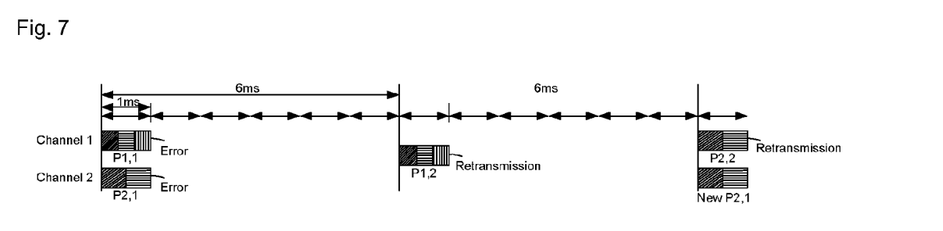
FIG. 7 is a schematic diagram of a retransmission in the case that two streams use different Modulation and Coding Schemes, the stream 1 has an error, and the stream 2 also has an error when the AGI exists according to an embodiment of the disclosure.

FIG. 7 is a schematic diagram of a retransmission in the case that two streams use different Modulation and Coding Schemes, the stream 1 has an error and the stream 2 also has an error when the AGI exists according to an embodiment of the disclosure. As shown in FIG. 7, in this case, the stream 1 is transmitted in a single-stream transmission approach in a next transmission opportunity, and the IR version of the transmitted stream is P1,2; in an transmission opportunity after the next one, the streams are transmitted in a multi-stream transmission approach, the IR version of the transmission of the stream 1 is P2,2, and the stream 2 transmits a new data block P2,1. Firstly, when an data transmission error occurs to the spatial sub-channel having a better channel condition, in order to the reliability of retransmitting the stream 1, when a next data transmission opportunity comes, only the stream 1 to be retransmitted is transmitted, and data of the stream 2 are not transmitted any longer, so as to avoid the effect of inter-channel interference on the retransmission result of the stream 1. After the stream 1 is retransmitted, when a next retransmission opportunity comes, the data transmission is performed in a multi-stream transmission approach, the channel 1 where the stream 1 is located transmits a stream with a IR version of P2,2, and the stream 1 still transmits a new data block P2,1.

The embodiments of the disclosure perform a stream retransmission by using a feature of a MIMO system that different transmission approaches can be used in different cases, and adopt an adaptive conversion between a single-stream technique and a multi-stream technique, thus improving the reliability of a data retransmission, improving the success rate of a data retransmission, and also improving the retransmission performance of a system.

Figure 8:
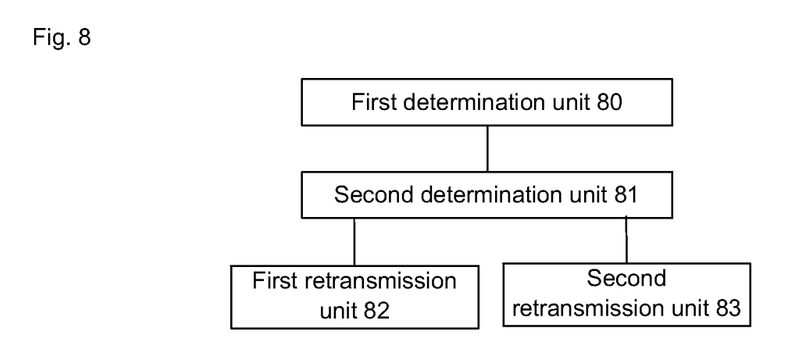
FIG. 8 is a structural diagram of a device for retransmitting data under AGI according to an embodiment of the disclosure.

FIG. 8 is a structural diagram of a device for retransmitting data under AGI according to an embodiment of the disclosure. As shown in FIG. 8, the device for retransmitting data under AGI according to the embodiment of the disclosure includes: a first determination unit 80, a second determination unit 81, a first retransmission unit 82 and a second retransmission unit 83, wherein the first determination unit 80 is configured to: when it is determined that gains of multiple antennas at a transmission terminal are imbalanced, trigger the second determination unit;

the second determination unit 81 is configured to: when it is determined that streams transmitted by the multiple antennas adopt a same Modulation and Coding Scheme, trigger the first retransmission unit 82; and when streams transmitted by the multiple antennas adopt different Modulation and Coding Schemes, trigger the second retransmission unit 83.

the first retransmission unit 82 is configured to use a better spatial sub-channel, in the multiple antennas to retransmit data; and the second retransmission unit 83 is configured to: when the streams transmitted by the multiple antennas adopt different Modulation and Coding Schemes, use a better spatial sub-channel in the multiple antennas to retransmit data and/or use a single-stream approach to retransmit data.

The above first determination unit 80 further includes: a channel estimation module (not shown in FIG. 8), a calculation module (not shown in FIG. 8) and a determination module (not shown in FIG. 8), wherein the channel estimation module is configured to perform a channel estimation according to pilot information transmitted by the transmission terminal;

the calculation module is configured to calculate Signal Interference Noise Ratios (SINRs) corresponding to streams transmitted by the multiple antennas according to a channel estimation result;

the determination module is configured to: when difference between calculated SINRs exceeds a preset threshold, determine that the AGI exists.

The first retransmission unit 82 is further configured to: when only one stream has an error, use a spatial sub-channel having a better channel performance in the multiple antennas to retransmit the stream having an error; and when all streams have an error, each spatial sub-channel retransmits correspondingly its own stream having an error.

The second retransmission unit 83 is further configured to: when only one stream has an error, use a spatial sub-channel having a better channel performance in the multiple antennas to retransmit data, or use the single-stream approach to retransmit data; and when all streams have an error, use the single-stream approach first in the multiple antennas to retransmit streams having an error on the spatial sub-channel having a better channel performance, then use the spatial sub-channel having a better channel performance in the multiple antennas to retransmit streams having an error on other spatial sub-channels.

There may be two spatial sub-channels for transmitting a stream.

It should be appreciated by those skilled in the art that functions of the above processing units and processing modules of the device for retransmitting data under AGI as shown in FIG. 8 may be implemented by a corresponding hardware circuit or implemented in a way of operating a corresponding executable software through a processor. The corresponding functions of all the above units can be understood with reference to the description in FIG. 1 to FIG. 7, and details of the above functional units and modules coordinating with each other to implement the aforementioned method for retransmitting data under AGI will be omitted.

What described are merely preferable embodiments of the disclosure, and are not intended to limit the disclosure.

Industrial Applicability

In the disclosure, when a network side determines that gains of multiple antennas at a transmission terminal are imbalanced, a better spatial sub-channel is used by multiple antennas to retransmit data when streams transmitted by the multiple antennas adopt a same Modulation and Coding Scheme, and a better spatial sub-channel is used by the multiple antennas to retransmit data and/or a single-stream approach is used to retransmit data when the streams transmitted by the multiple antennas adopt different Modulation and Coding Schemes. Thus, success rate for retransmitting a stream is improved and ensured.

The invention claimed is:

1. A method for retransmitting data under Antenna Gain Imbalance (AGI), comprising:
    determining that gains of multiple antennas at a transmission terminal are imbalanced;
    using a better spatial sub-channel in the multiple antennas to retransmit data when streams transmitted by the multiple antennas adopt a same Modulation and Coding Scheme; and
    using a better spatial sub-channel in the multiple antennas to retransmit data and/or using a single-stream approach to retransmit data when the streams transmitted by the multiple antennas adopt different Modulation and Coding Schemes.

2. The method according to claim 1, wherein the step of determining that gains of multiple antennas at a transmission terminal are imbalanced comprises:
    performing a channel estimation according to pilot information transmitted by the transmission terminal, calculating Signal Interference Noise Ratios (SINRs) corresponding to streams transmitted by the multiple antennas, and when difference between calculated SINRs exceeds a preset threshold, determining that the AGI exists.

3. The method according to claim 2, wherein there are two spatial sub-channels for transmitting a stream.

4. The method according to claim 1, wherein the step of using a better spatial sub-channel in the multiple antennas to retransmit data when streams transmitted by the multiple antennas adopt a same Modulation and Coding Scheme comprises:
    when only one stream has an error, using a spatial sub-channel having a better channel performance in the multiple antennas to retransmit the stream having an error; and
    when all streams have an error, retransmitting correspondingly, by each spatial sub-channel, its own stream having an error.

5. The method according to claim 4, wherein there are two spatial sub-channels for transmitting a stream.

6. The method according to claim 1, wherein the step of using a better spatial sub-channel in the multiple antennas to retransmit data and/or using a single-stream approach to retransmit data when the streams transmitted by the multiple antennas adopt different Modulation and Coding Schemes comprises:
    when only one stream has an error, using a spatial sub-channel having a better channel performance in the multiple antennas to retransmit data, or using the single-stream approach to retransmit data;
    when all streams have an error, using first the single-stream approach in the multiple antennas to retransmit streams having an error on the spatial sub-channel having a better channel performance, then using the spatial sub-channel having a better channel performance in the multiple antennas to retransmit streams having an error on other spatial sub-channels.

7. The method according to claim 6, wherein there are two spatial sub-channels for transmitting a stream.

8. The method according to claim 1, wherein there are two spatial sub-channels for transmitting a stream.

9. A device for retransmitting data under Antenna Gain Imbalance (AGI), comprising: a first determination unit, a second determination unit, a first retransmission unit and a second retransmission unit, wherein the first determination unit is configured to: when it is determined that gains of multiple antennas at a transmission terminal are imbalanced, trigger the second determination unit;

the second determination unit is configured to: when it is determined that streams transmitted by the multiple antennas adopt a same Modulation and Coding Scheme, trigger the first retransmission unit; and when streams transmitted by the multiple antennas adopt different Modulation and Coding Schemes, trigger the second retransmission unit;

the first retransmission unit is configured to use a better spatial sub-channel in the multiple antennas to retransmit data; and the second retransmission unit is configured to: when the streams transmitted by the multiple antennas adopt different Modulation and Coding Schemes, use a better spatial sub-channel in the multiple antennas to retransmit data and/or use a single-stream approach to retransmit data.

10. The device according to claim 9, wherein the first determination unit further comprises: a channel estimation module, a calculation module and a determination module, wherein the channel estimation module is configured to perform a channel estimation according to pilot information transmitted by the transmission terminal;

the calculation module is configured to calculate Signal Interference Noise Ratios (SINRs) corresponding to streams transmitted by the multiple antennas according to a channel estimation result;

the determination module is configured to: when difference between calculated SINRs exceeds a preset threshold, determine that the AGI exists.

11. The device according to claim 10, wherein there are two spatial sub-channels for transmitting a stream.

12. The device according to claim 9, wherein the first retransmission unit is further configured to: when only one stream has an error, use a spatial sub-channel having a better channel performance in the multiple antennas to retransmit the stream having an error; and when all streams have an error, retransmit correspondingly, by each spatial sub-channel, its own stream having an error.

13. The device according to claim 12, wherein there are two spatial sub-channels for transmitting a stream.

14. The device according to claim 9, wherein the second retransmission unit is further configured to: when only one stream has an error, use a spatial sub-channel having a better channel performance in the multiple antennas to retransmit data, or use the single-stream approach in the multiple antennas to retransmit data; and when all streams have an error, use the single-stream approach first in the multiple antennas to retransmit streams having an error on the spatial sub-channel having a better channel performance, then use the spatial sub-channel having a better channel performance in the multiple antennas to retransmit streams having an error on other spatial sub-channels.

15. The device according to claim 14, wherein there are two spatial sub-channels for transmitting a stream.

16. The device according to claim 9, wherein there are two spatial sub-channels for transmitting a stream.

* * * * *